US011504658B2

(12) United States Patent
Surdick et al.

(10) Patent No.: US 11,504,658 B2
(45) Date of Patent: Nov. 22, 2022

(54) SPIN-ON FILTER ASSEMBLY WITH REPLACEABLE CORELESS ELEMENT

(71) Applicant: Schroeder Industries, LLC, Leetsdale, PA (US)

(72) Inventors: Scott F. Surdick, Pittsburgh, PA (US); Christopher B. Bortnik, Warrendale, PA (US)

(73) Assignee: SCHROEDER INDUSTRIES, LLC, Leetsdale, PA (US)

(*) Notice: Subject to any disclaimer, the term of this patent is extended or adjusted under 35 U.S.C. 154(b) by 78 days.

(21) Appl. No.: 17/096,422

(22) Filed: Nov. 12, 2020

(65) Prior Publication Data

US 2021/0138373 A1    May 13, 2021

Related U.S. Application Data

(60) Provisional application No. 62/934,505, filed on Nov. 12, 2019.

(51) Int. Cl.
*B01D 35/30*   (2006.01)
*B01D 29/13*   (2006.01)

(52) U.S. Cl.
CPC ............. *B01D 35/30* (2013.01); *B01D 29/13* (2013.01); *B01D 2201/0415* (2013.01); *B01D 2201/12* (2013.01); *B01D 2201/304* (2013.01); *B01D 2201/305* (2013.01); *B01D 2201/347* (2013.01); *B01D 2201/4023* (2013.01); *B01D 2201/4092* (2013.01)

(58) Field of Classification Search
CPC ............................. B01D 35/30; B01D 29/13; B01D 2201/0415; B01D 2201/12; B01D 2201/304; B01D 2201/305; B01D 2201/347; B01D 2201/4023; B01D 2201/4092; B01D 29/21; B01D 2201/291
See application file for complete search history.

(56) References Cited

U.S. PATENT DOCUMENTS 3,625,363 A * 12/1971 Eberle ................... B01D 27/103
                                                          210/441
5,846,416 A * 12/1998 Gullett .................... B01D 29/21
                                                          210/DIG. 17

* cited by examiner

*Primary Examiner* — Waqaas Ali
(74) *Attorney, Agent, or Firm* — Blynn L. Shideler; Krisanne Shideler; BLK Law Group

(57) ABSTRACT

A spin-on filter assembly with replaceable coreless element comprises: a reusable spin-on housing including a filter bowl having sealing structure on a bottom of the filter bowl and a sealing structure on a top of the filter bowl; a center support tube integral with the filter bowl and including a perforated tube and an upper portion having an threaded coupling allowing for the filter assembly to threaded into position and an exterior sealing structure; and a replaceable coreless filter element mounted on the central support tube within the filter bowl and having filter media, a lower sealing structure configured to engage with the sealing structure on the bottom of the filter bowl and an upper sealing structure configured to engage with the exterior sealing structure on the center support tube.

15 Claims, 4 Drawing Sheets

SPIN-ON FILTER ASSEMBLY WITH REPLACEABLE CORELESS ELEMENT

RELATED APPLICATIONS

This application claims priority to provisional U.S. patent application Ser. No. 62/934,505 filed Nov. 12, 2019, titled "Spin-on Filter Assembly with Replaceable Coreless Element" which application is incorporated herein by reference in its entirety.

BACKGROUND INFORMATION

1. Field of the Invention

The present invention relates to filter assemblies, and more particular the inventors Scott F. Surdick and Christopher B. Bortnick have developed a spin-on filter assembly with a reusable housing and a replaceable eco-friendly coreless element.

2. Background Information

The concept of coreless replaceable filter elements is generally known in conventional filter housing configurations. The concept of a coreless filter element is known to provide a lighter weight, more environmentally-friendly (ecofriendly) alternative to filter elements with a metal core. Used in conjunction with a permanent metal core, which conventionally is integrated with the housing, coreless filter elements are easily pulled from the core when plugged. Being coreless, they are significantly lighter in weight, facilitating both removal and replacement. Disposal costs are less for coreless elements because they are crushable, reducing volume up to 50% over metal-cored elements.

Spin-on filter assemblies, or simply spin-on filters, are known and historically consist of a metal cannister housing a filter media with a top cap or head threaded directly to a threaded post that forms part of the filter flow-path. These are also called canister filters and are generally disposed of completely when the media is clogged. Automobile oil filters represent a common well-known example of this filter assembly type. These conventional spin-on filter assemblies create difficulties in disposal as the metal housing adds waste and volume and prevents incineration as a method of disposal.

There remains a spin-on filter assembly with a reusable housing and replaceable eco-friendly elements.

SUMMARY OF THE INVENTION

This invention is directed to a cost effective, efficient, spin-on filter assembly with a reusable housing and replaceable eco-friendly coreless elements.

One aspect of the invention provides a spin-on filter assembly with replaceable coreless element comprises: a reusable spin-on housing including a filter bowl having sealing structure on a bottom of the filter bowl and a sealing structure on a top of the filter bowl; a center support tube integral with the filter bowl and including a perforated tube and an upper portion having an threaded coupling allowing for the filter assembly to threaded into position and an exterior sealing structure; and a replaceable coreless filter element mounted on the central support tube within the filter bowl and having filter media, a lower sealing structure configured to engage with the sealing structure on the bottom of the filter bowl and an upper sealing structure configured to engage with the exterior sealing structure on the center support tube.

These and other advantages of the present invention will be described below in connection with the associated figures in which like reference numerals represent like elements throughout.

BRIEF DESCRIPTION OF THE SEVERAL FIGURES

DESCRIPTION OF THE PREFERRED EMBODIMENT

The present invention is directed to a spin-on filter assembly 10 with an ecofriendly coreless replaceable filter element 60.

Figure 1:
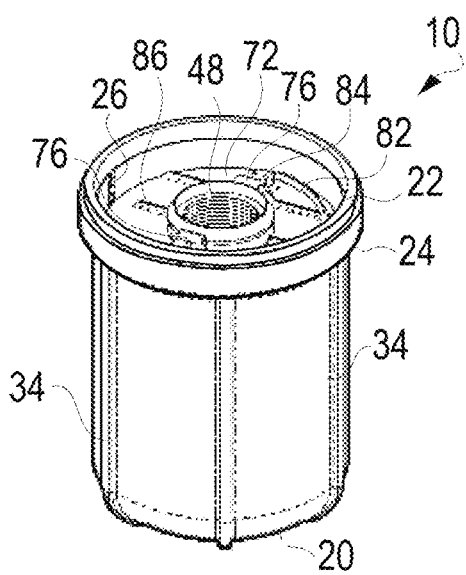
FIG. 1 is a perspective view of a spin-on filter assembly with replaceable eco-friendly coreless element according to one embodiment of the present invention.

FIG. 1 is a perspective view of a spin-on filter assembly 10 with replaceable eco-friendly coreless element 60 according to one embodiment of the present invention. The overall design concept can be described as a polymer spin-on "can" housing comprising a filter bowl 20 with sealing member 22 and center support tube 40 that is re-usable and uses a coreless filter element 60 or cartridge element. The present invention yield numerous benefits, including: i) a reduction of the waste footprint by eliminating the traditional steel spin-on can as the coreless element 60 can be crushed, shredded and burned, ii) an elimination of the outsourcing of the "canning" process, iii) wide or nearly universal application as nearly any current media recipe can be incorporated in the cartridge element 60, and authenticating replacement element sealing structure using a Reverse GeoSeal® brand design assures element compliance.

The spin-on filter assembly 10 of the present invention is easily designed to fit the following known conventional spin-on heads: Schroeder, Hydac, Parker, Donaldson, Pall and Zinga. The filter assembly 10 as shown in the figures has the following specifications: Max Operating Pressure—100 psi (7 bar), Max Flow Rate—50 gpm (190 lpm).

Figure 2:
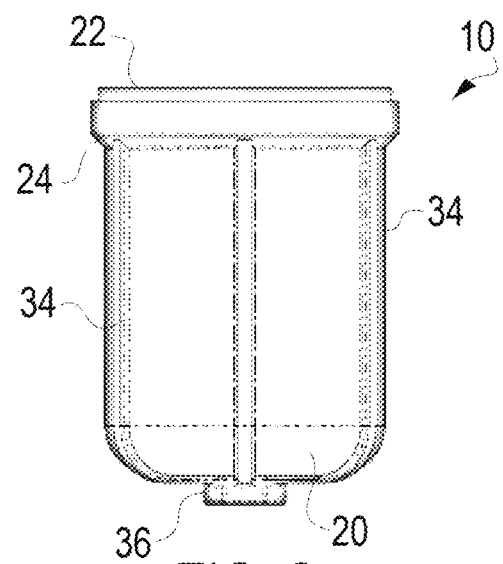
FIG. 2 is a side elevation view of the filter assembly of FIG. 1.
Figure 3:
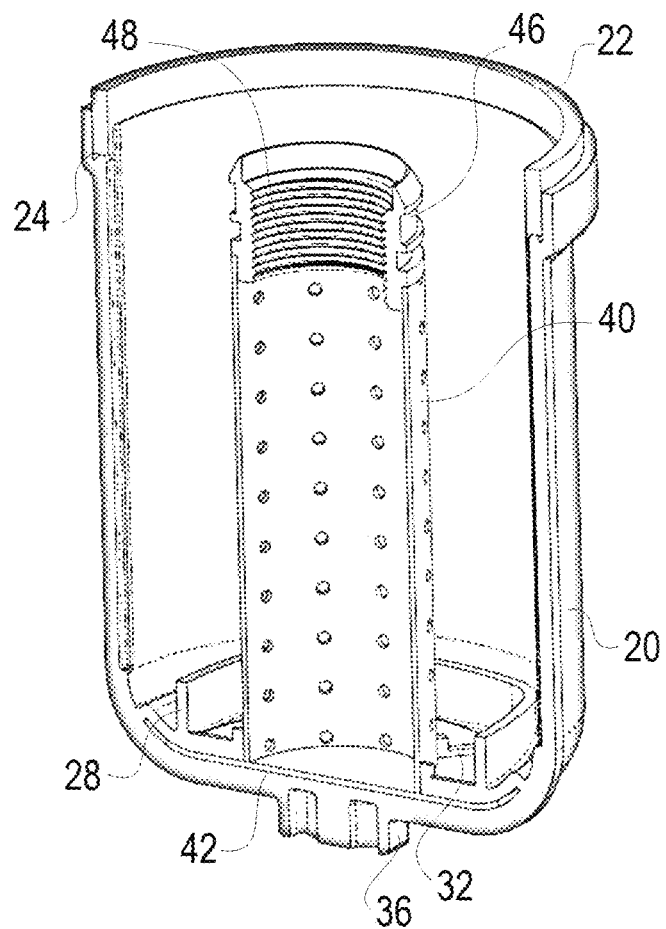
FIG. 3 is a perspective sectional view of the filter bowl and center support tube of the filter assembly of FIG. 1.

FIG. 2 is a side elevation view of the filter assembly 10 of FIG. 1, mainly illustrating the filter bowl 20. FIG. 3 is a perspective sectional view of the housing comprising the filter bowl 20, sealing member 22 and center support tube 40 of the filter assembly of FIG. 1. The housing is composed of three main components, the polymer molded filter bowl 20, the generally metal center support tube 40, and the filter assembly sealing member 22 that sits in an annular groove 24 on the upper surface of the filter bowl 20. The phrase "upper surface" is merely a relative term used for the convenience of this application and not intended to define the orientation of the filter assembly 10 in any given implementation. The polymer filter bowl 20 is injection molded over the center tube assembly 40.

Figure 4:
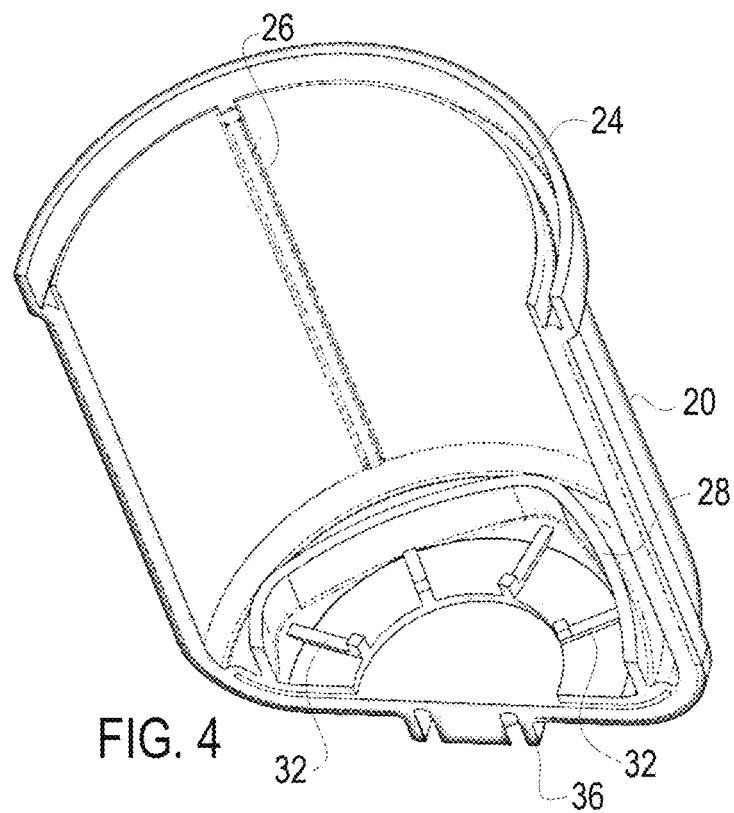
FIG. 4 is a perspective sectional view of the filter bowl of the filter assembly of FIG. 1.

FIG. 4 is a perspective sectional view of the filter bowl 20 illustrating the interior features of the filter bowl 20. The top of the filter bowl includes an annular groove 24, or seal cavity, receives the sealing member 22 therein. The sealing member 22 seals against a cooperating surface similar to seals in conventional spin on filter assemblies.

The interior of the filter bowl 20 includes two filter element alignment slots or grooves or guideways 26 that receive cooperating ears 78 on the filter element 60 to assure the filter element 20 is properly aligned for receipt in the filter bowl 20. The specific unique number and circumferential position of the slots, grooves or guideways 26 can be used to assure the filter element 60 is rated for the specific intended application of the spin-on filter assembly 10. Namely the position and number of slots, grooves or guideways 26 can change with different operating parameters, and only the filter element 60 rated for such use will have corresponding ears 78, whereby an operator is less likely to accidentally attempt to install a filter element 60 that is not rated for the specifics that the given spin-on filter assembly 10 has been designed. Further, due to the mismatch of ears 78 and slots, grooves or guideways 26 if a wrong element 60 is selected the assembly 10 prevents such installation.

A second filter element authenticating structure in the filter bowl 20 is a specially shaped sealing face 28 on the bottom of the filter bowl 20 that seals against a radial seal 66 on the filter element 60. The sealing face 28 has a unique non-circular profile, specifically shown is a reverse GEO-SEAL® brand sealing shape. The radial seal 68 will have a complementary shape. The shape of the sealing surface 28, similar to the guideways 26, can change with the operating parameters of the intended assembly 10 so that inappropriate filter elements 60 cannot be accidentally installed.

The interior of the filter bowl 20 further includes base ribs 32 to prevent face sealing with the media of the filter element 60 which can otherwise decrease the performance of the element.

Figure 5:
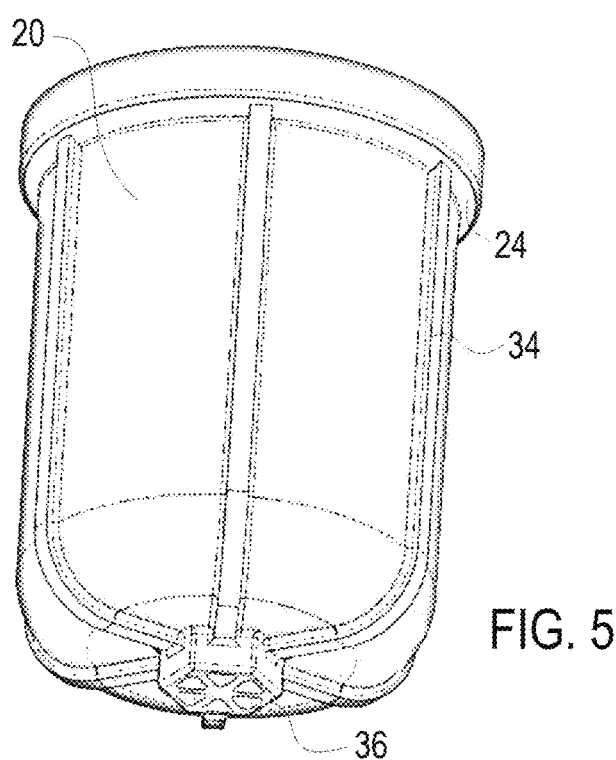
FIG. 5 is a perspective bottom-side view of the filter bowl of the filter assembly of FIG. 1.

FIG. 5 is a perspective bottom-side view of the filter bowl 20 of the filter assembly 10 of FIG. 1 illustrating the exterior features of the filter bowl 20. The exterior of the filter bowl 20 includes longitudinal ribs 34 that add structural support to the filter bowl 20, and additionally provide hand holds for manual spinning of the filter bowl 20 into position. The bottom of the exterior of the filter bowl 20 includes a molded hex-shaped integral nut 36 for tightening of the spin-on filter assembly 10 into position. The term bottom, like "upper surface" or top, is purely for convenience herein and does not reflect position of the assembly 10 in any given installation.

Figure 6:
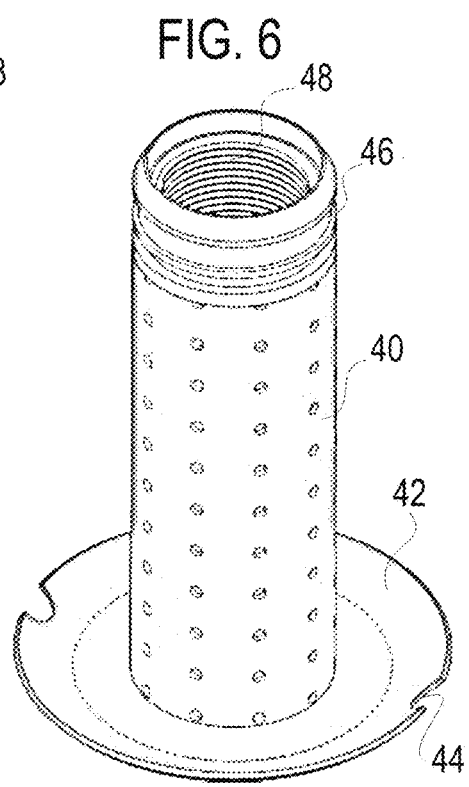
FIG. 6 is a perspective view of the center support tube of the filter assembly of FIG. 1.
Figure 7:
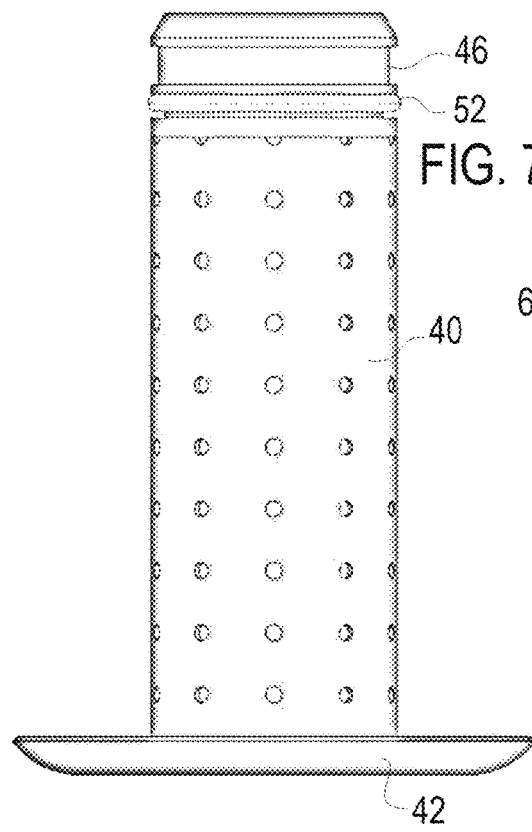
FIG. 7 is a side elevation view of the center support tube of the filter assembly of FIG. 1.

FIGS. 6 and 7 illustrate the center support tube 40, generally metal, of the filter assembly 10 of FIG. 1 which is over-molded or insert molded to be integral with the filter bowl 20. The center support tube 40 includes a radially extending base flange 42 that is over-molded into the base of the filter bowl 20 and provides strength to the filter bowl 20 in practice. The base flange 40 includes notches (or openings) 44 that will lock the center support tube 40 to the filter bowl 20 by the polymer material of the filter bowl 20 filling the notches or openings 44 during the molding process and thereby act to prevent relative spinning during installation of the assembly 10.

Extending from the base flange 42 of the center support tube 40 is a perforated tube that forms the core for the coreless filter element 60. The upper portion of the center support tube 40 above the core forming component is an interior threaded coupling 48 and exterior sealing structure or collar. The interior threads of coupling 48 allow for the filter assembly 10 to be threaded into position—or spun on. The user can manually spin the filter bowl 20 with the assistance of the ribs 34 then use the bottom hex nut 36 for final tightening to assure a good seal between the top sealing member 22 and the associated sealing surface.

The exterior sealing structure includes an O-ring seat that receives an O-ring seal 52 configured to seal against a cooperating surface 74 of a top endcap 72 of the ecofriendly replaceable filter element 60. Above the O-ring seal 52 is an element retaining groove 46 that is positioned to receive the locking retaining clips 76 of the filter element 60 that provides a tactile and audible response to the user that the filter element 60 has been properly seated during installation. The clips 76 engaging the retaining groove 46 maintain the element 60 in the proper position during operation, and during installation and movement of the filter assembly 10.

Figure 8:
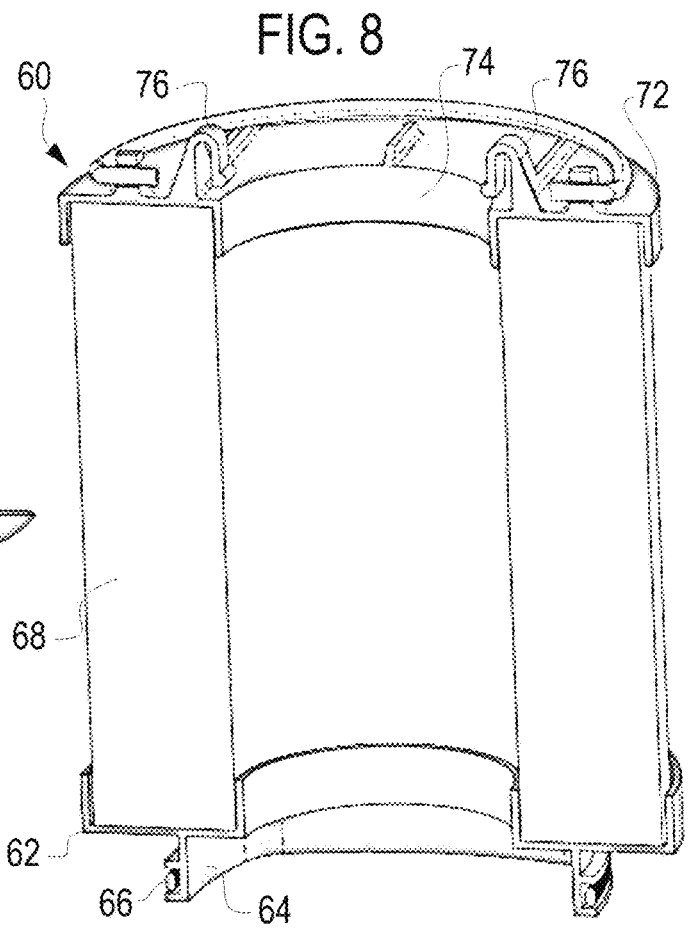
FIG. 8 is a side section view of the coreless ecofriendly filter element of the filter assembly of FIG. 1.
Figure 9A:
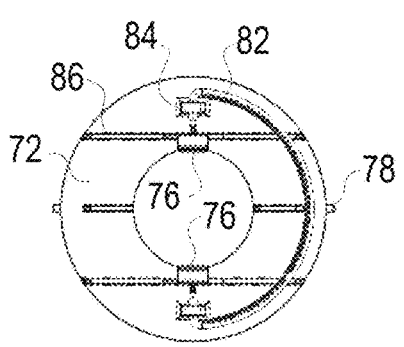
FIGS. 9A, 9B and 9C are top plan, bottom plan and side elevation views, respectively, of the coreless ecofriendly filter element of the filter assembly of FIG. 1.
Figure 9B:
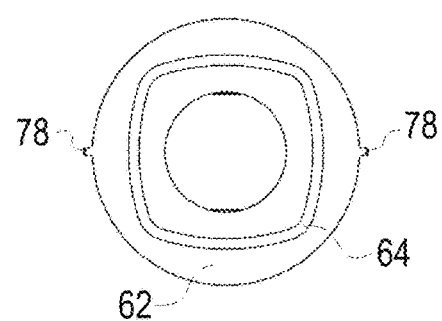
Figure 9C:
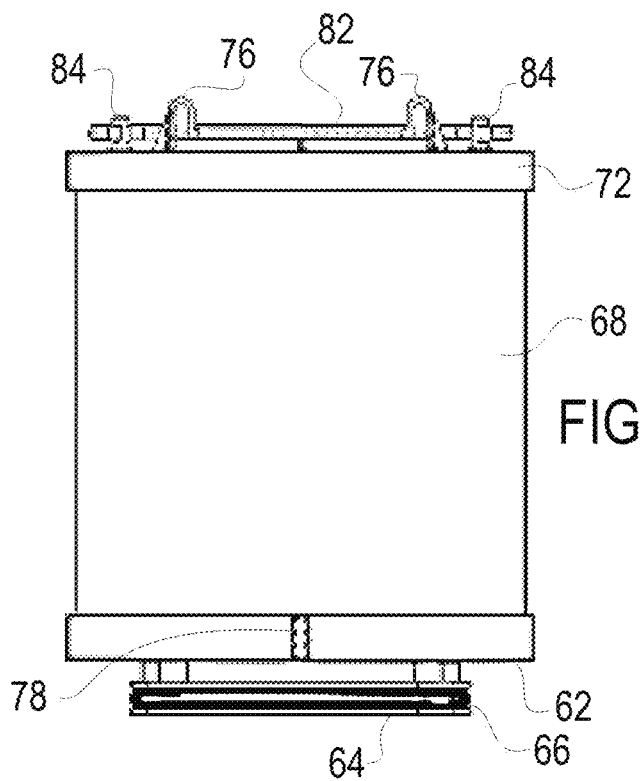

FIG. 8 is a side section view of the coreless ecofriendly filter element 60 of the filter assembly 10 of FIG. 1 and FIGS. 9A, 9B and 9C are isometric views thereof. The coreless filter element 10 includes a lower endcap 62 having a projecting rim 64 with a radially outward facing sealing member 66 that has a peripheral shape matching with the sealing surface 28 of the bottom of the filter bowl 20. The projecting rim 64 has a complementary shape as the authenticating sealing surface 28 of the filter bowl 20 and the shape thereof is intended to change with the operating parameters of the particular designated use (or operating range) of the assembly 10 such that the filter element 60 will always match the intended use and operating parameters for a designated filter bowl 20/assembly 10. As mentioned above, the lower endcap 62 includes alignment ears 78 received in cooperating slots 26 on the filter bowl 20 to assure proper alignment of the filter element 60 and the filter bowl 20. The lower endcap 62 is generally a one-piece structure with separate sealing O-ring 66 and may be injection molded (except for the seal 66 itself).

The filter element 60 includes filter media 68, such as a pleated filter media, extending from the lower endcap 62 to the upper endcap 72 and configured to treat the fluid flowing therethrough. The filter media 68 may be pleated media as described, or any desired media for the desired fluid filtration or treatment. The filter media 68 may be formed as composite media of distinct types. The filter media 68 may be coupled to the lower endcap 68 and the upper endcap 72 through adhesive such as epoxy.

As noted, the ecofriendly filter element 60 includes an upper endcap 72 coupled to the filter media 68 and spaced from the lower endcap 62. The coupling of the filter media 68 to the upper endcap 72 can be substantially the same as the coupling between the filter media 68 and the lower endcap 62, namely via adhesive such as epoxy. The upper endcap 72 includes a sealing surface or face 74 configured to engage with and seal against the sealing member 52 of the support tube 40. As noted above the upper end cap 72 include retaining clips 76 that engage with the retaining groove 46 to have the element 60 snap into place and assure the support tube seal 52 is engaging the sealing surface 74 of the upper endcap 72 and the O-ring 66 on the lower endcap 62 is sealing against the sealing surface 28 on the bottom of the filter bowl 20. The upper endcap 72 includes a pivoted handle 82, rotationally mounted in hubs 84 for easy removal and transport of the filter element 60. The upper endcap 72 can include ribs 86 that will add structural integrity to the end cap 72 and support the handle 82 is a raised stored position that is easier to grasp.

Figure 10:
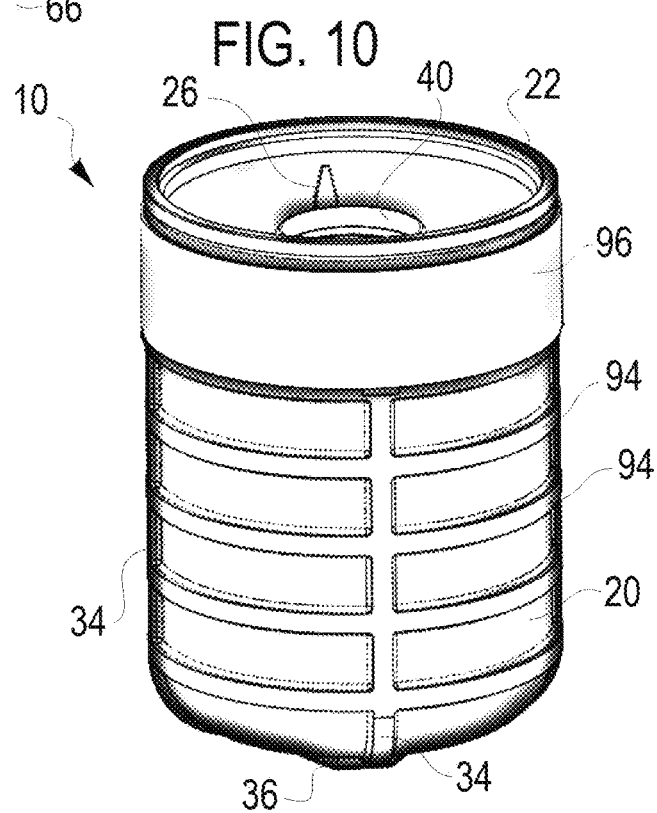
FIG. 10 is a perspective view of a spin-on filter assembly with replaceable eco-friendly coreless element according to a modified embodiment of the present invention.

FIG. 10 is a perspective view of a spin-on filter assembly 10 with replaceable eco-friendly coreless element 60 according to a modified embodiment of the present invention. FIG. 10 shows the assembly 10, as described above, with two additional and separate hoop reinforcement elements in the filter bowl 20. The first hoop type elements are molded hoop ribs or circumferential ribs 94 in the bowl structure 20 that combine and intersect with the longitudinal ribs 34 and which adds structural integrity to the bowl 20. Additionally to further increase the strength and rigidity of the open end of the bowl 20 a separate reinforcement band 96 has been added near the open end. The band 96 may be metal and will counter creep deformation of a polymer bowl 20 due to time, pressure and temperature. The band may be added during molding in an insert molding process or added post molding. Additionally the band could be "undersized" to provide a preloading to the bowl.

The spin-on filter assembly 10 with replaceable eco-friendly coreless element 60 according to the present invention provides a substantially polymer reusable spin-on filter bowl 20 with a reusable and integrated over-molded center support tube 40 using a coreless filter element or cartridge element 60. The present invention reduces the waste footprint by substantially eliminating the traditional disposable steel spin-on can. The coreless element 60 can be crushed, shredded and burned. The present invention eliminates the "canning" process. The assembly 10 of the present invention may be adapted to nearly any current media recipe and the present invention includes authenticating replacement element structures The preferred embodiments described above are illustrative of the present invention and not restrictive hereof. It will be obvious that various changes may be made to the present invention without departing from the spirit and scope of the invention. The precise scope of the present invention is defined by the appended claims and equivalents thereto.

What is claimed is:

1. A spin-on filter assembly with replaceable coreless element comprising:
    a reusable spin-on housing including a filter bowl having sealing structure on a bottom of the filter bowl and a sealing structure on a top of the filter bowl;
    a center support tube integral with the filter bowl and including a perforated tube and an upper portion having an threaded coupling allowing for the filter assembly to threaded into position and an exterior a sealing structure, wherein the center support tube is metal and molded to be integral with the filter bowl, wherein the center support tube includes a radially extending base flange over-molded into the base of the filter bowl, wherein the base flange includes openings locking the center support tube to the filter bowl via material of the filter bowl filling the openings during the molding process;
    a replaceable coreless filter element mounted on the center support tube within the filter bowl and having filter media, a lower sealing structure configured to engage with the sealing structure on the bottom of the filter bowl and an upper sealing structure configured to engage with the exterior sealing structure on the center support tube.

2. The spin-on filter assembly with replaceable coreless element according to claim 1, wherein the sealing structure on a bottom of the filter bowl includes a sealing face on the bottom of the filter bowl that seals against a radial seal forming the lower sealing structure of the filter element.

3. The spin-on filter assembly with replaceable coreless element according to claim 2, wherein the sealing face forming the sealing structure on a bottom of the filter bowl has a non-circular profile, and wherein the radial seal forming the lower sealing structure of the filter element has a complementary shape.

4. The spin-on filter assembly with replaceable coreless element according to claim 1, wherein the sealing structure on a top of the filter bowl includes an annular groove which receives a sealing member, and wherein the sealing member is configured to seal against a cooperating surface.

5. The spin-on filter assembly with replaceable coreless element according to claim 1, wherein the interior of the filter bowl includes at least one filter element alignment guideways that receive a cooperating ear on the filter element to properly align the filter element for receipt in the filter bowl.

6. The spin-on filter assembly with replaceable coreless element according to claim 1, wherein the filter bowl includes exterior ribs.

7. The spin-on filter assembly with replaceable coreless element according to claim 1, wherein the filter bowl includes an exterior molded hex-shaped integral nut.

8. The spin-on filter assembly with replaceable coreless element according to claim 1, wherein the filter bowl includes at least one exterior hoop reinforcement element.

9. The spin-on filter assembly with replaceable coreless element according to claim 8, wherein at least one exterior hoop reinforcement element includes a separate reinforcement band.

10. The spin-on filter assembly with replaceable coreless element according to claim 1, wherein extending from the base flange of the center support tube is a perforated tube that forms the core for the coreless filter element.

11. The spin-on filter assembly with replaceable coreless element according to claim 10, wherein the upper portion of the center support tube is above the core forming component and includes an interior threaded coupling forming the threaded coupling.

12. The spin-on filter assembly with replaceable coreless element according to claim 11, wherein the exterior sealing structure of the center support tube includes an O-ring seat that receives an O-ring seal configured to seal against a cooperating surface of a top endcap of the replaceable filter element.

13. The spin-on filter assembly with replaceable coreless element according to claim 12, wherein the exterior sealing structure of the center support tube includes an element retaining groove positioned to receive locking retaining clips of the filter element, wherein the clips engage the retaining groove to maintain the element in the operational position.

14. A reusable spin-on housing for use with a replaceable coreless element including a filter bowl having a sealing structure on a bottom of the filter bowl and a sealing structure on a top of the filter bowl and a center support tube integral with the filter bowl and including a perforated tube and an upper portion having an threaded coupling allowing for the filter assembly to threaded into position and an exterior sealing structure, wherein the center support tube is metal and molded to be integral with the filter bowl, and wherein the center support tube includes a radially extending base flange over-molded into the base of the filter bowl, wherein extending from the base flange of the center support tube is a perforated tube that forms the core for the coreless filter element, and wherein the upper portion of the center support tube is above the core forming component and includes an interior threaded coupling forming the threaded coupling.

15. The reusable spin-on housing according to claim 14, wherein the exterior sealing structure of the center support tube includes an O-ring seat that receives an O-ring seal configured to seal against a cooperating surface of a top endcap of the replaceable filter element, and wherein the exterior sealing structure of the center support tube includes an element retaining groove positioned to receive locking retaining clips of the filter element.

\* \* \* \* \*